US012090930B2

(12) United States Patent
Lindman et al.

(10) Patent No.: US 12,090,930 B2
(45) Date of Patent: Sep. 17, 2024

(54) SAFETY SYSTEM FOR PUBLIC TRANSIT

(71) Applicant: City of Torrance—Torrance Transit, Torrance, CA (US)

(72) Inventors: Paul Arthur Lindman, Redondo Beach, CA (US); Ivan De La Torre, La Puente, CA (US); Victor Manuel Orejel, Norwalk, CA (US); Arturo Estrada, Los Angeles, CA (US)

(73) Assignee: CITY OF TORRANCE, Torrance, CA (US)

( * ) Notice: Subject to any disclaimer, the term of this patent is extended or adjusted under 35 U.S.C. 154(b) by 161 days.

(21) Appl. No.: 17/450,681

(22) Filed: Oct. 12, 2021

(65) Prior Publication Data

US 2022/0111803 A1   Apr. 14, 2022

Related U.S. Application Data

(60) Provisional application No. 63/090,332, filed on Oct. 12, 2020.

(51) Int. Cl.
*B60R 13/08* (2006.01)

(52) U.S. Cl.
CPC ................ *B60R 13/0823* (2013.01)

(58) Field of Classification Search
CPC ................................. B60R 13/0823
USPC ........................................ 296/24.4
See application file for complete search history.

(56) References Cited

U.S. PATENT DOCUMENTS

| 3,234,583 | A | | 2/1966 | Kempel | |
|---|---|---|---|---|---|
| 3,547,217 | A | * | 12/1970 | Emmett | B60R 21/12 180/286 |
| 5,004,286 | A | * | 4/1991 | Taylor, III | B60R 21/12 109/9 |
| 7,032,946 | B1 | * | 4/2006 | Brown | B60R 21/12 49/54 |
| D667,357 | S | * | 9/2012 | Lee | D12/400 |
| 10,220,859 | B2 | * | 3/2019 | Reese | A63G 9/04 |
| 11,059,498 | B2 | * | 7/2021 | Evans | B61B 13/04 |
| 2011/0147358 | A1 | | 6/2011 | Kober et al. | |
| 2014/0210225 | A1 | | 7/2014 | Manzke | |
| 2017/0120935 | A1 | * | 5/2017 | Reese | A63G 9/04 |
| 2017/0327070 | A1 | * | 11/2017 | Schmidt | B60R 21/12 |

FOREIGN PATENT DOCUMENTS

| AU | 649916 B2 | * | 6/1994 | | |
|---|---|---|---|---|---|
| CA | 2946642 A1 | * | 4/2017 | ............ | A63G 21/20 |
| CN | 210680652 U | * | 6/2020 | | |
| GB | 2574474 A | * | 12/2019 | ............ | A63G 21/20 |
| WO | 2011124950 A1 | | 10/2011 | | |
| WO | 2022082176 A1 | | 4/2022 | | |

* cited by examiner

*Primary Examiner* — Hilary L Gutman
(74) *Attorney, Agent, or Firm* — BUCHALTER, PC; Cecily Anne O'Regan (57) ABSTRACT

Systems and methods described herein provide a safety system for use within an interior of a vehicle. The Safety System described herein may include a protection panel coupled to a support for a slider style protection interface.

9 Claims, 4 Drawing Sheets

SAFETY SYSTEM FOR PUBLIC TRANSIT

PRIORITY

The instant application claims priority to U.S. Provisional Patent Application No. 63/090,332, filed Oct. 12, 2020, which is incorporated in its entirety herein.

BACKGROUND

Public transit may include buses, trains, or other movable environment in which a worker navigates the vehicle through a location and one or more passengers are passengers that get on and off as their needs require. Conventionally, public transit workers sit in a front part of the vehicle to control the vehicle, while passengers sit and/or stand in a rear part of the vehicle. The passengers may, however, pass the vehicle operator or have access to the vehicle operator.

Systems may be used to separate a vehicle operator. For example, a swing door may be positioned between the operator and a remainder of the vehicle interior. However, such swing doors may create blockages. For example, a bus may have passengers positioned in the space outside of the operator's door that can prevent the door from swinging outward and permitting the operator from leaving the driver compartment. Operators may become trapped within their space if something were to be positioned to prevent the opening of the door. This situation may be common when the bus accommodates physically impaired passengers getting on or off of the vehicle. If a passenger needs assistance from an operator, the passenger may create the obstacle preventing the operator from opening the door and accessing the passenger. Such swing doors may also be impeded by other objects within the interior of the vehicle such that the door may not fully open and provide easy access to the vehicle interior intended for the operator's seat and control area. In addition, doors that swing open conventionally must be fully closed in order to operate the vehicle.

SUMMARY

Exemplary embodiments of the Safety System described herein may include a slider style protection interface. The protection interface may be configured to slide along rails. The protection interface may include one or more handles for easy access, including opening and closing from either side of the protection interface. The protection interface may be fully transparent, partially transparent, semi-transparent, and combinations thereof to reduce obstructing the operator's peripheral vision and permit supervision of the passengers by the operator.

In an exemplary embodiment, the safety system may include one or more locking mechanisms. For example, the system may permit locking the door in an open and/or closed position. The locking mechanisms may include electronic and/or manual locks and/or releases. In an exemplary embodiment, the locking mechanism comprises an electronic lock to retain the door in an open or a closed position. The electronic locking mechanism may include a manual release for additional safety of the operator. The electronic locking mechanism may also include a fail open safety such that in the event of power loss, the locking mechanism defaults to open.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments of the protection system and method described herein include a protection panel. The protection panel may be built into a transit vehicle and/or may be retrofitted into a vehicle after the vehicle manufacture. Exemplary embodiments shown herein include different components. It would be understood that any combination of components may be used in any combination without departing from the scope of the instant disclosure.

Exemplary embodiments described herein are shown and described in terms of a public transit vehicle being a bus. Other vehicles are also considered herein, including, for example, trains, trollies, trams, vans, airplanes, etc. Exemplary embodiments also are shown and described as use for a bus in which the operator is a bus driver and the associated bus operator area is a driver's seat of the operator. However, other spaces may also be segregated, and for use by other operators. For example, in the case of an airplane, the flight attendant may take advantage of configurations described herein for separating a flight attendant area from a passenger space. This area may include the portion of the plane in which the attendant may make drinks or prepare food or otherwise perform tasks of the flight attendant in which the attendant wishes to be segregated from the rest of the passengers. Exemplary embodiments described herein may therefore be used to segregate an interior space of a vehicle from other interior spaces of the vehicle, such as from passenger spaces to operator or attendant spaces.

Figure 1A:
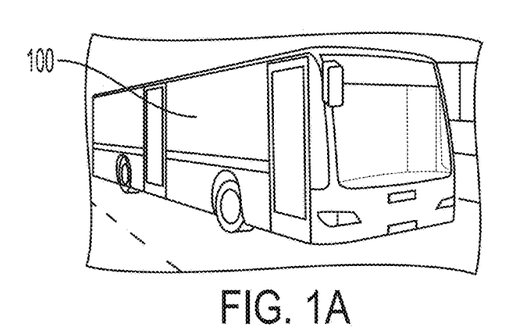
FIGS. 1A-1B illustrate an exemplary safety system according to embodiments described herein.
Figure 1B:
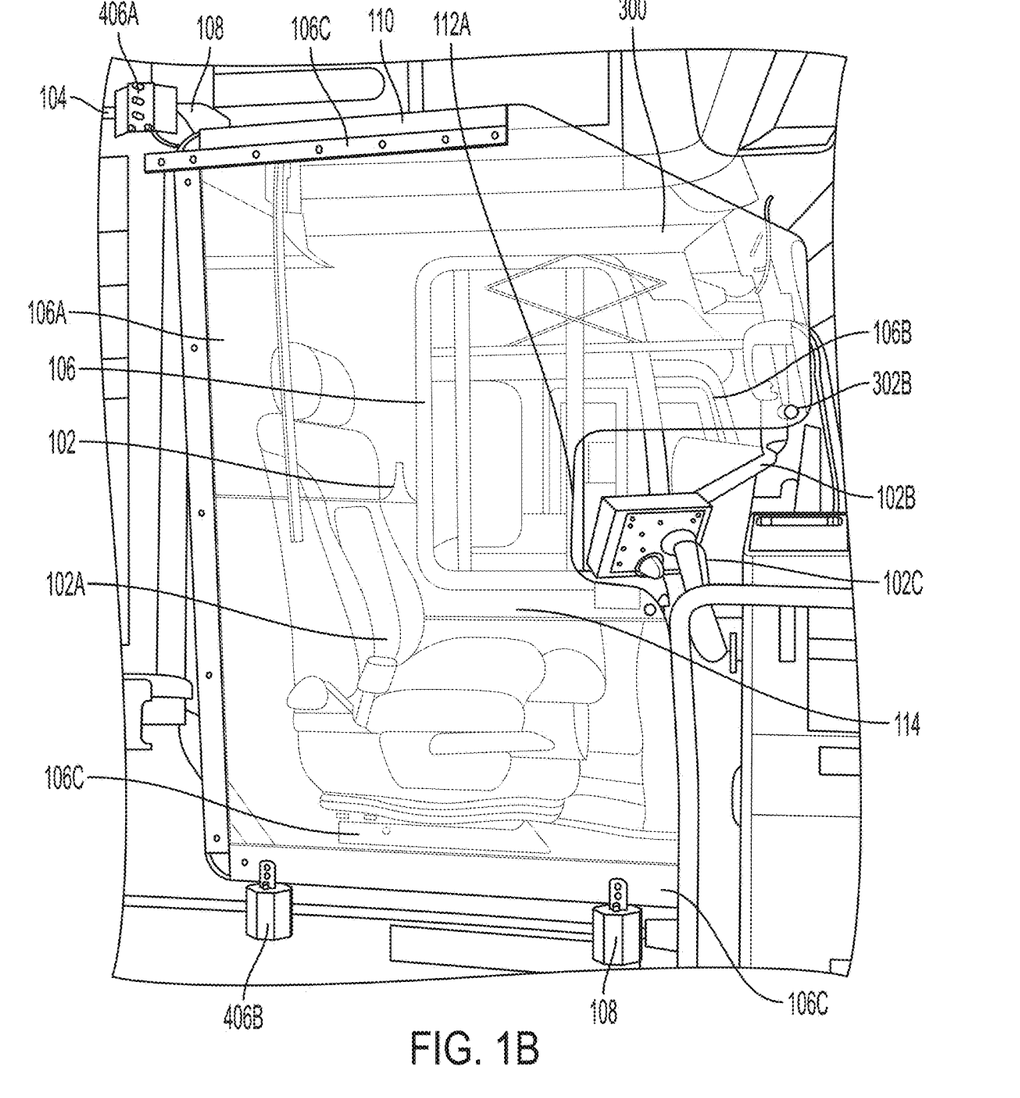

FIG. 1A illustrates an exemplary vehicle that can take advantage of the exemplary safety system shown and described herein. FIG. 1B illustrates an exemplary safety system according to embodiments described herein.

A public transportation bus 100 is illustrated in FIG. 1A. A portion of the interior of the public transportation bus is illustrated in FIG. 1B. The interior of the bus 100 includes an operator's area 102 including a seat 102A, steering wheel 102B, controls for operating the vehicle door, and/or other controls and components 102C. The public transportation bus may also include one or more handrails 104 extending longitudinally along the length of the bus at an upper area of the interior of the bus. The handrails may be configured for passengers to use when walking along the bus, and/or in standing on the bus to retain their balance.

Exemplary embodiments described herein include a protection panel 106. The protection panel may include a piece of material. The piece of material may be configured to separate the operator of the public transportation bus from the passengers of the bus. The separation may be for physical contact separation and/or germ separation. For example, the piece of material may be solid and define a complete separation barrier to reduce the passage of germs from passing from the passengers to the operator. The piece of material may also be a high grade or strong material such that it could withstand one or more hits from an objected wielded by a passenger. For example, the piece of material may be configured to deflect one or more blows from a typical passenger using a hammer, bat, or other blunt object. The protection panel may therefore define a security door such that the operator may be exposed to reduced encounters of battery from passengers or provide a fluid barrier from passengers and their germs. In an exemplary embodiment, the piece of material defines a covered area. In an exemplary embodiment, the protection panel 106 comprises a clear, high strength plastic, planar panel.

The protection panel 106 as illustrated in FIG. 1B may be transparent. For example, the piece of material may be fully transparent. The protection panel 106 may also be partially transparent. For example, a portion of the piece of material may be transparent. In an exemplary embodiment, the protection panel is sufficiently and/or substantially transparent such that the protection panel does not adversely affect the peripheral view of the operator, the view by the operator of the interior of the vehicle, and/or the view of the operator of the passengers. In an exemplary embodiment, part of the protection panel may be opaque or translucent. Such configuration may be used to protect or shield the operator and/or actions of the operator from view of a passengers. In an exemplary embodiment, the piece of material is approximately ¼-1 inch piece of plexiglass. The piece of material may be, for example, approximately half-inch.

Figure 2:
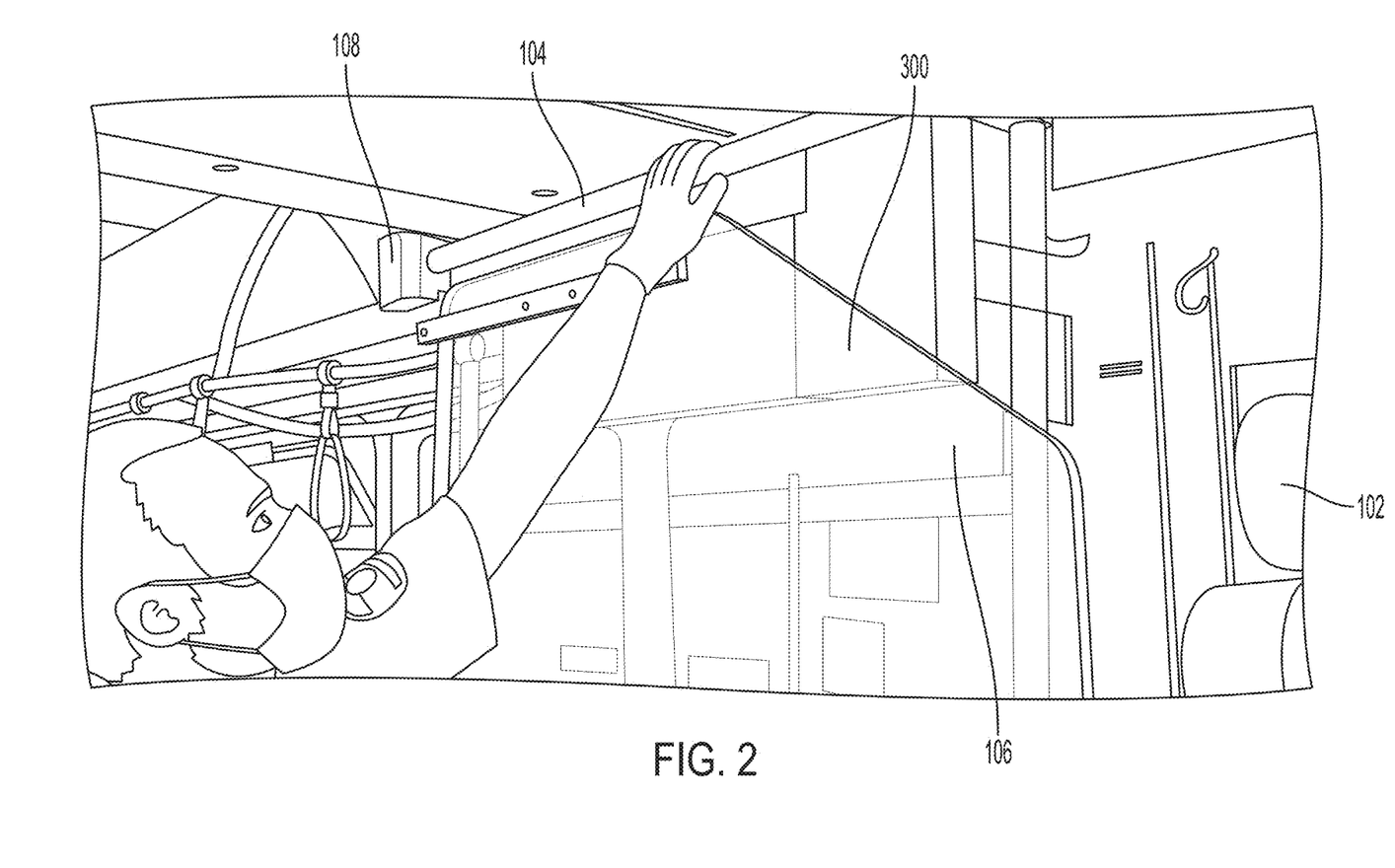
FIG. 2 illustrates an exemplary portion of the safety system according to embodiments described herein.

In an exemplary embodiment, the protection panel 106 may include a connection device 108. The connection device may be configured to attach the piece of material to a rail 104 of the vehicle. In an exemplary embodiment, the connection device 108 defines or creates a sliding engagement between the protection panel 106 and the handrail 104 of the bus. In an exemplary embodiment, the protection panel 106 is configured to integrate into a bus using existing one or more handrails 104 within the vehicle. However, other configurations may also be used, such as by incorporating rails within the interior of the vehicle. FIG. 1B illustrates an exemplary vehicle 100 configuration in which the existing handrail 104 terminates behind or adjacent to the rear of the operator area 102. In FIG. 2 the connection device 108 is shown installed within a housing. The connection device 108 may therefore couple at this location and support the protection panel 106 as it slides along the rail and projects forward toward the front of the vehicle beyond the handrail in a closed position. Exemplary embodiments may include configurations in which the handrail extends forward along the side of the operator area.

In an exemplary embodiment, the incorporation of the door onto handrails permits the door to be aesthetically integrated into the design of the bus and not apparently a retrofit into a bus. The use of the rails also provides structural rigidity and ease of addition to a vehicle. The handrail may be part of the original vehicle or may be added to the vehicle to support the piece of material. In either event, the rail may be used as a handrail for passengers to use when entering the vehicle and moving toward the rear of the vehicle. Exemplary embodiments may therefore include a support for connection with the connection system in the form of a rail. The rail may approximate or be the same tubing or rail used for handrails or extension rails within the interior of the vehicle. The protection panel may therefore create an integrated appearance with the rest of the vehicle.

In an exemplary embodiment, the piece of material may be partially or fully frameless. In this example configuration, more of the protection panel 106 may be transparent and minimize the interference or obstruction of the passenger and/or operator view, and/or riding experience. In an exemplary embodiment, the reduction of visual indicators of the presence of the protection panel may minimize the feeling of enclosure by the operator. The reduction of visual cues may also reduce or prevent obstruction of a field of view, and/or motion sickness cues to the operator and/or passengers. In an exemplary embodiment, the piece of material may include a first side 106A, and two opposing adjacent sides 106C to the first side, and a second side 106B opposite the first side. In an exemplary embodiment, the second side 106B is toward a front of a vehicle, and the first side 106A is toward a rear of the vehicle. To define a frameless or partially frameless piece of material, at least one side of the piece of material may not include a frame or may otherwise be unobstructed or uncovered. As seen in FIG. 1B, the second side 106B of the piece of material does not include a frame. For example, a first side 106A, a first of the adjacent sides 106C, a second of the adjacent sides 106C, and any combination thereof may be reinforced with a frame. As described more fully below, the adjacent sides 106C and/or first side 106A may support the connection system 108. The frame 110 may be used to support the connection system 108. In an exemplary embodiment, the second side 106 B opposite the first side 106A is not reinforced with a frame 110. The second side 106B may be toward the front of the vehicle. The second side may also be toward an opening side of the protection panel.

In an exemplary embodiment, the projection panel 106 may comprise a terminal edge shaped to protect the driver and/or provide handle access. As illustrated, the second side 106B may have a terminal perimeter edge that is contoured as described herein. The contoured terminal edge may define surfaces for a first handle 112A, and a second handle 302B such as shown in FIG. 3B.

The protection panel may include a connection device 108 (shown in more detail in FIGS. 4A-4D). The connection device 108 may be a linear bearing. The connection device 108 may include a roller mechanism. The roller mechanism may permit the connection device 108, and coupled piece of material (e.g., protection panel 300) to translate along a rail 104. In an exemplary embodiment, the connection device 108 may comprise a clamp over a rail 104. The rail 104 may include a handrail 104 for use by passengers moving along the bus.

FIGS. 4A-4D illustrate exemplary different views of an exemplary connection system 108 comprising a roller system on a portion of a rail 104 according to embodiments described herein. In an exemplary embodiment, the connection system 108 comprises one or more wheels 410 to contact and roll along a rail 104. As illustrated, four wheels (e.g., wheels 410, 411, 412, 413) are used in a set, and one or more sets may be used in an exemplary connection system 108. In an exemplary embodiment, a set of wheels may include four wheels configured to contact different locations of a rail 104 offset about the circumference of the rail 104. The wheels 410 may be at approximately the same longitudinal position along the rail or may be longitudinally offset. In an exemplary embodiment, a first set of four wheels are positions at approximately the same longitudinal position along a first axis and circumferentially offset from each other about the rail 104, and a second set of wheels longitudinally aligned with each other are longitudinally offset from the first set of wheels. The second set of wheels may approximately align with the circumferential positions of the first set of wheels or may be offset thereto.

As illustrated in FIGS. 4A-4D two pairs of two wheels each define the set of four wheels. A first pair of wheels 410, 411 are coupled to a first connection plate 420 and a second pair of wheels 412, 413 are coupled to a second connection plate 422. The first connection plate 420 and second connection plate 422 may be coupled together with a spacer 430 positioned there between. The spacer 430 may include one or more nuts 432, 433 to permit the relative distance between the first connection plate 420 and second connection plate 422 to be adjusted. The adjustment may be used to improve the contact of the wheels 410, 411, 412, 413 of the roller mechanism to the rail 104 and retrofit rails of different sizes with the same connection system. Each of the pairs of wheels may be positioned on a 90 degree shaft 408 so that the axis of the wheels may be approximately 90 degrees. As illustrated, each connection plate 420, 422 may have coupled thereto a 90 degree shaft. A pair of wheels may be coupled to the 90 degree shaft on opposing sides of the connection plate. As illustrated, the wheel may be on a shaft 408 extending from a face of the 90 degree shaft. The wheel shaft 408 may include jam nuts 410', 410" to retain the wheel 410 in a desired separation distance. The one or more jam nuts may be used to customize a position of the wheels such that the connection system 108 may be configured to accommodate different rail 104 sizes and/or different rail configurations. The customization of the wheel positions, and/or in the repositioning of the wheels may alternatively or additionally be used to maintain the system in view of wear and tear of the wheels to replace one or more wheels and/or accommodate the variable wear of the wheels over time. Exemplary embodiments may be customized and/or maintained to reduce rattling and/or noise from the connection system.

In an exemplary embodiment, the roller mechanism comprises at least four wheels 410, 411, 412, 413 configured to contact different locations of a rail 104 about a circumference of the rail 104 when the protection panel is integrated into a vehicle. The roller mechanism may be configured to adjust the tension imposed by the connection device 108 onto the rail 104 or support member. The roller mechanism may include one or more jam nuts 410', 410" to adjust a position and corresponding force of one or more of the wheels (e.g., wheel 410) when the protection panel is coupled to a rail 104. The adjustment of the rollers on the rail may also be used to customize the force used to translate the piece of material along the rail 104. For example, the wheels may be clamped on the rail 104 with additional pressure so that additional force is required to translate the protection panel relative to the support member and/or along the support member. The tension may be set so that the protection panel may retain a position along the rail during normal operation of the vehicle such as by driving without sliding. The adjustment may also be used to minimize the required force used to translate the protection panel, reduce rattling and/or noise from the protection panel attachment, and/or other desired attributes of the connection.

In an exemplary embodiment, the connection device 108 comprises at least two roller mechanisms 406. For example, one of the at least two roller mechanisms is on a first connection side of the piece of material such as a protection panel 300 (along one of the adjacent edges or at the corner between the first side 406A and the adjacent edge 106C), and a second of the at least two roller mechanisms is on a second connection side of the piece of material (such as along the second one of the adjacent edges 106C opposite the one of the adjacent edges). The first connection side may be on an opposite side from the second connection side. Referring to FIG. 1B, a first roller mechanism 406A may be along a top edge of the piece of material or protection panel, while a second roller mechanism 406B may be along a bottom edge of the piece of material. As illustrated, the bottom edge includes two separate roller mechanisms. In an exemplary embodiment, the top includes a single roller mechanism as the rail for the protection panel terminates behind the front edge of the protection panel, when the protection panel is in a closed position. If the support member, or rail, extends further, the top may include more than one roller mechanism.

In an exemplary embodiment, the system may include a dual rail support member. In this case, one rail may be used to support the protection panel and permit the linear translation of the connection device on the one rail, while a second rail may be used by passengers for gripping and self support.

FIG. 2 illustrates an exemplary portion of the safety system according to embodiments described herein. The configuration of FIG. 2 illustrates the safety rail 104 that may be used as a handrail in addition to use as a support for the connection system of the protection panel.

In an exemplary embodiment, the connection system 108 comprises a robust system for securely coupling the piece of material to the vehicle. In an exemplary embodiment, the piece of material cannot be removed from the support member by pulling on the piece of material away from the support member.

Referring to FIG. 1B, the protection panel may include a piece of material. The piece of material may define a generally planar sheet having an outer perimeter. The piece of material may fully and completely cover the interior area within the outer perimeter. In an exemplary embodiment, spaces may be created in the interior area of the panel. In this case, the panel may include passage such as for air vents and/or to aid in hearing between passenger and/or operator. The piece of material may be a complete, continuous, uninterrupted, monolithic piece. In this case, the piece of material may operate as a separation or barrier between operator and passenger, such as to reduce the transmission of disease or germs.

In an exemplary embodiment, the outer perimeter of the piece of material defines a first side 106A and adjacent sides 106C extending from opposing ends of the first side. The first side and adjacent sides may approximate a portion or three sides of a rectangle. For example, the adjacent sides on opposing ends of the first side are at right angles to the first side. The sides may also be at different angles depending on the shape of the space to be separated. In an exemplary embodiment, the second side 106B is shaped to conform to an approximate shape of a front of an interior of a vehicle. For example, the second side comprises a tapered segment that extends from one of the adjacent sides away from the first side and toward an other of the adjacent sides. The tapered segment may be at a top portion of the piece of material and may, for example conform to a general taper of a front of a vehicle and/or front window of the vehicle and/or accommodate the overhead components at the front of the vehicle. The second side 106B of the piece of material may also include a vertical segment extending from an end of the tapered segment extending toward the other of the adjacent sides of the adjacent sides. The second side of the piece of material may also include a second vertical segment extending toward and intercepting with the other of the adjacent sides. The first vertical segment and/or second vertical segment may include a taper toward or away from the first side.

In an exemplary embodiment, the piece of material may include an indentation between the vertical segments of the second side. The indentation may be used as a handle 112A to assist the operator in opening the protection panel. The indentation may be any shape. For example, the indentation may define a portion of a prism (such as a square or rectangle), or may define a concave outward curve. In an exemplary embodiment, the second side comprises an indentation defining a minimum width of the protection panel measured perpendicularly across from the first side to the second side.

Figure 3A:
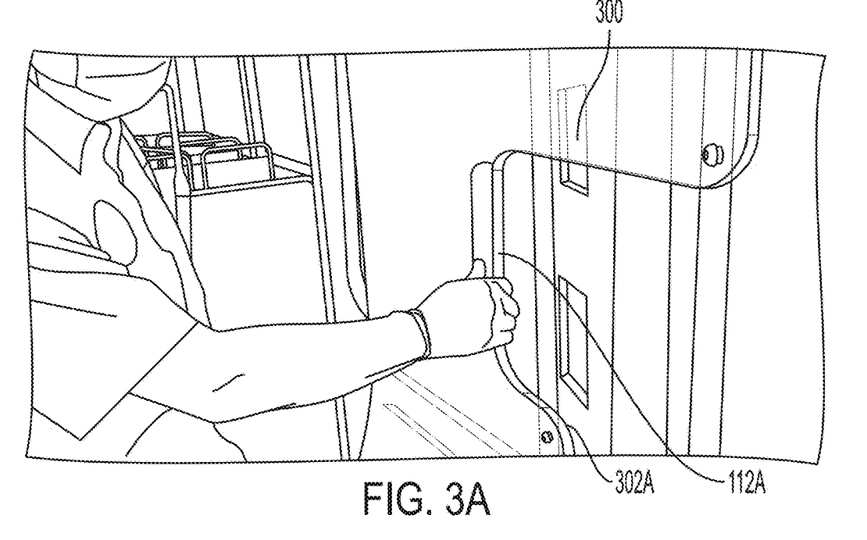
FIGS. 3A-3C illustrate exemplary portions of the safety systems according to embodiments described herein.
Figure 3B:
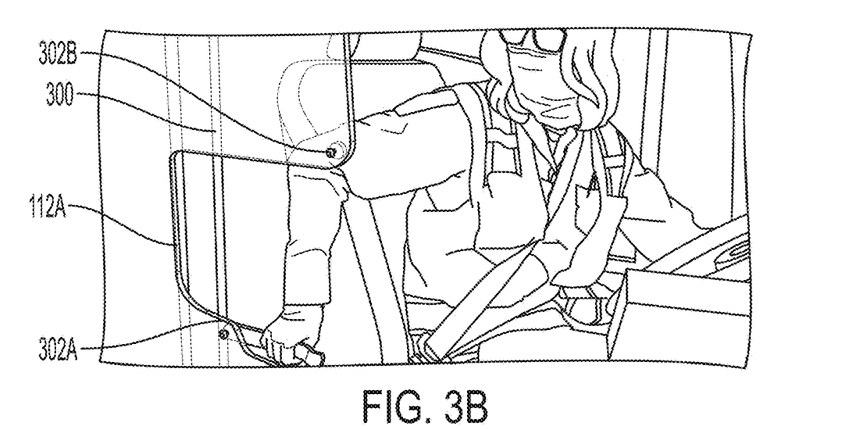

FIGS. 3A-3B illustrate exemplary portions of the protection panel according to embodiments described herein. Exemplary embodiments of the system are intended for ease of use by the operator. As such the system may include one or more interfaces 302A, 302B for operating the protection panel. For example, the protection panel may include one or more handles. Any combination of types and locations of handles may be used as described herein.

In an exemplary embodiment, the protection panel 300 may include a handle 310 as illustrated in FIG. 3A. The handle 112A may be created or defined by a shape of the protection panel 300 itself. For example, the protection panel 300 may include an indentation and/or protection in or out of the surface face of the panel (not shown). The indentation/protection may be used to provide a frictional engagement with the panel to assist in sliding the protection panel 300. As illustrated the protection panel 300 may include a cut away section or indentation in the terminal perimeter edge of the protection panel 300. The protection panel 300 itself may provide a gripping surface for the operator to grasp or terminal edge that the operator may push to close and/or open the protection panel 300 by sliding the protection panel 300 along the support member(s). Other handle arrangements may also be integrated into the protection panel, such as with an aperture or hole within the protection panel for an operator to put a finger, fingers, or a part of their hand through to assist in pull and/or push the protection panel.

In an exemplary embodiment, the protection panel 300 may include a handle 302B as illustrated in FIG. 3B. The handle 302B may include a knob, hook, strap, pull device or other projection coupled to the protection panel. As illustrated, the pull device includes a strap or cord bolted to the protection panel. The attachment of the pull device may be through adhering, bolting, rivets, screws, bonding or other attachment method. In an exemplary embodiment, the pull device is on a side of the protection panel 300 toward the operator's control area. The protection or handle may also or alternatively be on an outside of the protection panel 300 on a side away from the operator area. The pull device may also or alternatively be positioned at a terminal edge or end of the protection panel and extend therefrom. In an exemplary embodiment, the pull device includes a flexible member that does minimizes an impact object for the operator. In the event the operator were to brush against or knock against the handle, the handle may be configured to flex or deform, thereby minimizing injury to the operator.

Figure 3C:
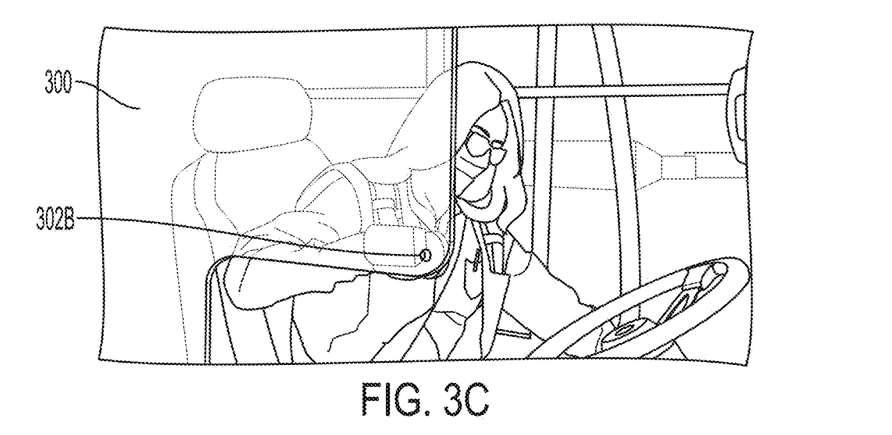
Figure 4A:
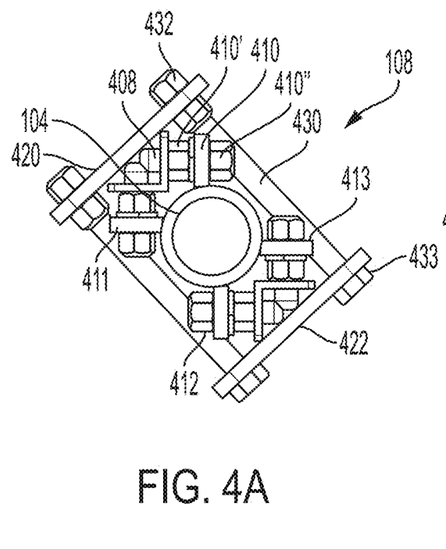
FIGS. 4A-4D illustrate exemplary different views of an exemplary roller system on a portion of a rail according to embodiments described herein.
Figure 4B:
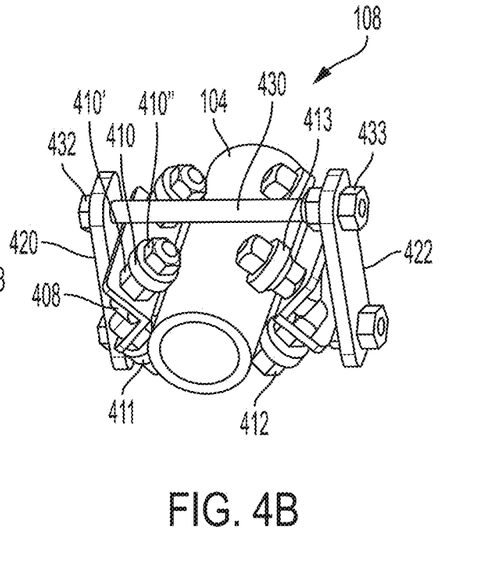
Figure 4C:
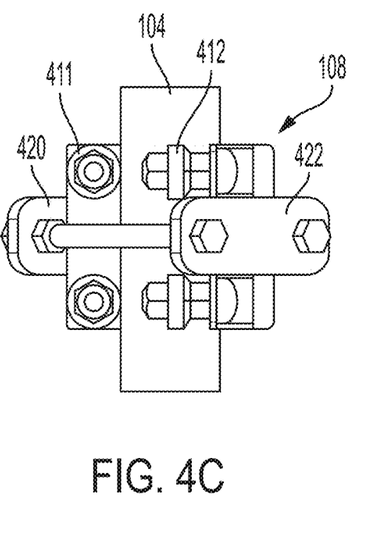
Figure 4D:
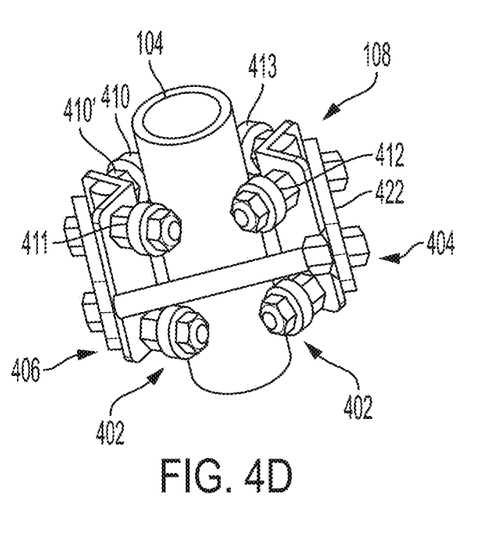

In an exemplary embodiment, the protection panel 300 may include a handle 302B as illustrated in FIG. 3C. The handle 302B may include a projection, such as a hook, knob, pull door handle, loop, strap, etc. In an exemplary embodiment, the pull device is on a side of the protection panel toward the operator's control area. The protection or handle may also or alternatively be on an outside of the protection panel on a side away from the operator area. The handle may also or alternatively be positioned at a terminal edge or end of the protection panel and extend therefrom.

As illustrated, the exemplary protection panel may include a first handle, a second handle, a third handle or any combination of handle(s). As used herein a first, second, third, or other numeric identifier is not intended to require a specific quantity or that a second is present only if a first is also present. Instead, the numeric identifiers are only intended to distinguish one from another. Therefore, the system may include a second handle and not include the first or third handle. In an exemplary embodiment, the first, second, and/or third handle may include a knob, cord, pull device, indentation of the protection panel, or other configuration described herein or known to a person of skill in the art.

In an exemplary embodiment, the system may include one or more locking systems 114 and/or mechanisms. For example, a locking system may be incorporated and configured to lock the piece of material is a first position, a second position, and intermediate position, and any combination thereof. A first position may be in an open position. A second position may be in a closed position. In an exemplary embodiment, the locking system comprises an electronic lock. The system may also include a manual lock and/or a manual release to override the electronic lock. In an exemplary embodiment, the electronic lock comprises a double throw electronic switch. In an exemplary embodiment, the switch and/or manual override, and/or manual lock control is in a position relative to the operator in a use position of the vehicle, such that the operator can easily and without overextension of their body reach and control the controls. In an exemplary embodiment, the ease of control is simply within arm's reach without movement of the body and/or without unseating the operator from a seat within the controller's area for operating the vehicle.

Exemplary embodiments of the system and methods described herein include a public transportation vehicle. The public transportation vehicle may have a protection panel integrated and/or built therein, such as at the time of manufacture, and/or may be retrofitted with a protection panel according to embodiments described herein. The public transportation vehicle may include a protection panel. The protection panel may include a piece of material defining a covered area and a connection device attached to the peace of material configured to attach to a rail for sliding engagement therewith.

In an exemplary embodiment, the piece of material is positioned between opposing sides of the vehicle in a position to separate an operator area of the vehicle from a passenger area of the vehicle. For example, the piece of material may be positioned parallel to lateral side walls of the vehicle.

In an exemplary embodiment, the connection device may couple to an interior of the vehicle such that the piece of material is configured to translate linearly within an interior of the vehicle. For example, the connection device may include a linear bearing. In an exemplary embodiment, the public transportation vehicle may include a handrail positioned along a top portion of the interior of the vehicle. The connection device may be configured to attach to the handrail.

As shown and described herein, exemplary embodiments include a method of retrofitting a public transportation vehicle. The method may include providing a public transportation vehicle having a handrail, and/or coupling a piece of material to the handrail. The coupling may be configured to provide linear translation of the piece of material along the handrail. The coupling may use a linear bearing on the rail attached to the piece of material.

The method may also include translating the piece of material to an open position to permit operator entrance to an operator area of the vehicle. The piece of material may also be translated to a closed position to separate the operator area of a remaining interior of the vehicle.

In an exemplary embodiment, the method to retrofit a vehicle may also include adjusting the linear bearing such that one or more wheels of the linear being are moved to provide pressure against the rail.

In an exemplary embodiment, the method may include installing an electronic lock coupled to the linear bearing to lock the linear bearing relative to the rail in a locked position. The installed locking system may also include a manual override locking system to permit a user to override the electronic lock. The system and method may also include positioning a control of the electronic lock and/or control of the manual override, and a handle coupled to the piece of material within arm's reach of an operated positioned in an operation position within the operator area.

Exemplary embodiments described herein may include a method of operating a protection panel within a public transportation vehicle, the protection panel comprising a material coupled to a rail on an interior of the vehicle for linear translation of the material relative to an interior of the vehicle. The method may include positioning the material is an open position to provide access to an operator area of the vehicle, repositioning the material to a closed position by sliding the protection panel along the rail, repositioning the material to the open position to provide access to the operator area, and any combination thereof. The method may include locking the protection panel in the closed position. The method may also include operating the vehicle while the protection panel is in an open position. The method may also include locking the protection panel by switching a double through electronic switch coupled to an electronic locking system. The method may also include overriding the electronic locking system may operating a manual override unlocking system coupled to the protection panel.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," "top", and "bottom", and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such use of words is not intended to be limiting or require a specific orientation, quantity, or presence of one component with another component. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include certain features, elements and/or states. However, such language also includes embodiments in which the feature, element or state is not present as well. Thus, such conditional language is not generally intended to imply that features, elements and/or states are in any way required for one or more embodiments or that one or more embodiments necessarily exclude components not described by another embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item.

As used herein, the terms "about," "substantially," or "approximately" for any numerical values, ranges, shapes, distances, relative relationships, etc. indicate a suitable dimensional tolerance that allows the part or collection of components to function for its intended purpose as described herein, as would be understood by a person of skill in the art. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

The invention claimed is:

1. A protection panel, comprising:
a piece of material defining a covered area; and
a rail with an exterior surface and a circular cross-section;
a connection device comprising
   a first connection plate,
   a second connection plate coupled via a spacer to the first connection plate and spaced parallel the first connection plate,
   a roller mechanism comprising
      a first pair of wheels coupled to a first L-bracket positioned adjacent the first connection plate operable to perpendicularly engage an exterior surface of the rail and allow the roller mechanism to translate along the longitudinal axis of the rail along a first half of the exterior surface of the rail, and
      a second pair of wheels coupled to a second L-bracket positioned adjacent the second connection plate operable to perpendicularly engage the exterior surface of the rail along a second half of the exterior surface of the rail opposite the first half of the exterior surface,
   one or more jam nuts operable to adjust a position and corresponding force of one or more of a wheel of the first pair of wheels and the second pair of wheels,
   wherein the connection device attaches the piece of material to the rail for sliding engagement therewith and further wherein a first wheel of the first pair of wheels engages the exterior surface of the rail at a location opposite a first wheel of the second pair of wheels.

2. The protection panel of claim 1, wherein the connection device is a linear bearing.

3. The protection panel of claim 1, wherein the piece of material comprises a generally planar sheet defining an outer perimeter, and the piece of material completely covering an interior area within the outer perimeter.

4. The protection panel of claim 3, wherein the outer perimeter defines a first side and two adjacent sides extending from opposing ends of the first side, the two adjacent sides on opposing ends of the first side are at right angles to the first side, wherein the first side and adjacent sides are reinforced with a frame and a second side opposite the first side is not reinforced with a frame.

5. The protection panel of claim 4, wherein the second side comprises an indentation defining a minimum width of the protection panel measured perpendicularly across from the first side to the second side, and the second side comprises a tapered segment that extends from one of the adjacent sides away from the first side and toward another of the adjacent sides, and the second side comprises a vertical segment extending from an end of the tapered segment extending toward the other of the adjacent sides of the adjacent sides, the second side further comprises an indentation extending from an end of the vertical segment defining a narrowed section of the protection panel, and a second vertical segment extending from an end of the indentation toward and intercepting with the other of the adjacent sides.

6. The protection panel of claim 1, further comprising a first handle and a second handle, wherein either or both of the first handle or the second handle is a knob.

7. The protection panel of claim 1, further comprising a locking system, wherein the locking system is configured to lock the piece of material in a first position and a second position.

8. A connection device comprising:
a first connection plate,
a second connection plate coupled via a spacer to the first connection plate and spaced parallel the first connection plate,
a roller mechanism comprising
   a first pair of wheels coupled to a first L-bracket positioned adjacent the first connection plate operable to perpendicularly engage an exterior surface of a rail and allow the roller mechanism to translate along the longitudinal axis of the rail along a first half of the exterior surface of the rail, and
   a second pair of wheels coupled to a second L-bracket positioned adjacent the second connection plate operable to perpendicularly engage the exterior surface of the rail along a second half of the exterior surface of the rail opposite the first half of the exterior surface,
one or more jam nuts operable to adjust a position and corresponding force of one or more of a wheel of the first pair of wheels and the second pair of wheels,
wherein the connection device is operable to attach a piece of material to the rail for sliding engagement therewith and further wherein a first wheel of the first pair of wheels engages the exterior surface of the rail at a location opposite a first wheel of the second pair of wheels.

9. The connection device of claim 8, wherein the connection device is a linear bearing.

* * * * *